No. 829,261. PATENTED AUG. 21, 1906.
W. FELD.
APPARATUS FOR SUBJECTING GASES TO THE ACTION OF LIQUIDS.
APPLICATION FILED DEC. 15, 1905.

WITNESSES
INVENTOR
Walther Feld
BY
Howson and Howson
ATTORNEYS

No. 829,261. PATENTED AUG. 21, 1906.
W. FELD.
APPARATUS FOR SUBJECTING GASES TO THE ACTION OF LIQUIDS.
APPLICATION FILED DEC. 15, 1905.

2 SHEETS—SHEET 2.

WITNESSES
INVENTOR
ATTORNEYS

UNITED STATES PATENT OFFICE.

WALTHER FELD, OF HÖNNINGEN-ON-THE-RHINE, GERMANY.

APPARATUS FOR SUBJECTING GASES TO THE ACTION OF LIQUIDS.

No. 829,261.　　　Specification of Letters Patent.　　　Patented Aug. 21, 1906.

Application filed December 15, 1905. Serial No. 291,902.

*To all whom it may concern:*

Be it known that I, WALTHER FELD, chemist and manufacturer, a subject of the King of Prussia, German Emperor, residing at Hönningen-on-the-Rhine, in the German Empire, have invented new and useful Improvements in Apparatus for Subjecting Gases or Vapors to the Action of Liquids, of which the following is a specification.

This invention has for its object to provide improved apparatus by which gases or vapors (such, for instance, as illuminating-gas and gases and vapors from coke-ovens, gas-producers, blast-furnaces, exhaust from steam or gas engines, steam from evaporators, and the like) are very efficiently subjected to the action of liquids which may be of any suitable description, such as solutions with or without agents suspended therein or liquids resulting from the condensation of vapors from the gases, or it may be water, oil, tar, or the like.

According to this invention the apparatus consists of or comprises a casing containing a vessel or vessels for the liquid, between which vessel or vessels and the casing is a space for the passage of gas and in and above the said vessel or each vessel is a rotatable device consisting of two or more concentric pipes for dipping into the liquid in the said vessel or vessels and extending above the said liquid, so that on rotation the said pipes will under centrifugal action take up only liquid between them and distribute it in the form of spray across the whole of the space through which the gases or vapors pass, so that the gases pass only through sprayed liquid. There may also be provided means for returning the sprayed liquid into the vessel or vessels, so that it circulates through the spraying device or devices, and a filter may be provided for separating moisture which the gases or vapors may have taken up from the sprayed liquid.

In order that this invention and how it may be performed may be well understood, I will describe, with reference to the accompanying drawings, arrangements in accordance therewith.

Figure 1:
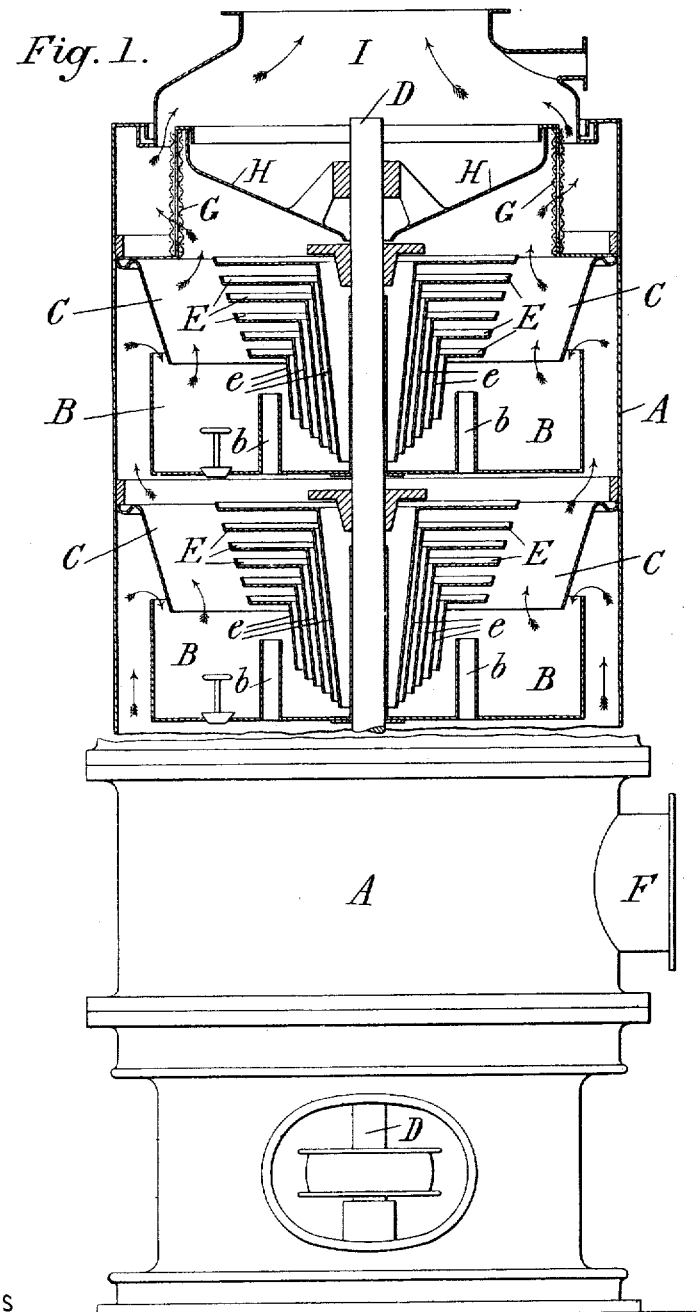
Figure 2:
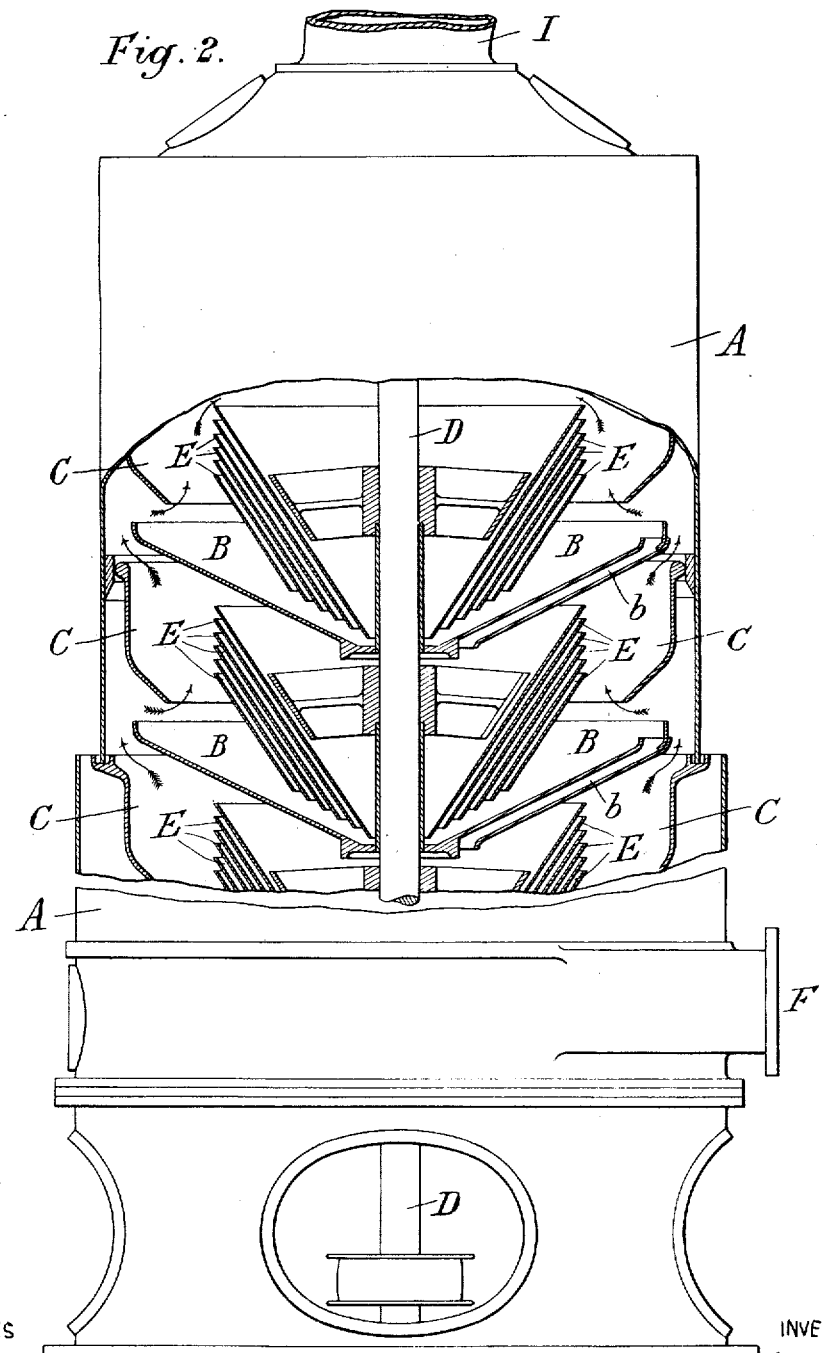

Figure 1 is a vertical section of one form of the apparatus, and Fig. 2 is a vertical section of a modification.

Referring first to the construction shown in Fig. 1, the apparatus consists of a casing A, containing a number of superposed vessels B, with a space between their outer sides and the casing A, the said vessels B holding the liquid. The said vessels B may be provided with any suitable overflows (such as those at *b*) to the vessel B beneath and also with any suitable arrangements of cleansing valves or openings and doors. Above each vessel B is an inclined funnel C, secured to the casing at its upper edge and with its lower edge directed to within the vessel B beneath. Passing down through the center of the apparatus is a rotatable shaft D, connected with which are concentric pipes *e*, dipping into the liquid in the vessel B, the said pipes *e* being arranged one within the other, so that there are spaces between them for the passage of liquid only up between the said pipes *e* and onto and off the said annular plates E, one carried by the upper part of each pipe, the said passage of liquid being induced by centrifugal action due to the motion of rotation given to the said pipes *e* and annular plates E when the shaft D is rotated, the liquid being under such centrifugal action thrown off from the said annular plates, so as to form a fine spray of the said liquid throughout the whole of the cross-sectional area of the space between the said annular plates E and the interior of the aforesaid funnel C, the gases or vapors entering from below at F and passing up, (as shown by the arrows,) the spaces between the outsides of the vessels B and the inside of the casing A, then between the edges of the said vessels B and of the inclined funnels C and up through the aforesaid spaces in which the liquid is sprayed, as aforesaid, where the said gases or vapors are very thoroughly subjected to the action of the sprayed liquid, passing, as they do, through sprayed liquid only. After the said gases or vapors pass from the uppermost divsion of the apparatus they pass through a filter G, which is preferably annular or cylindrical and arranged vertically, as shown, inside the upper part of the casing A, deflecting-surfaces H being arranged so that the gases or vapors are compelled to pass through the said filter G into the space between it and the casing and thence to the outlet I, the said filter G separating any liquid which may be carried up with the gases or vapors. The liquid can be admitted to the upper vessel through any suitable inlet and pass off through an outlet beneath the lowermost vessel. The plates E are shown with rims; but these can be omitted, as can also the said plates, as illustrated in the modification shown in Fig. 2, in which the vessels B are made of somewhat conical shape, and the overflow-passages are outside, as shown at *b*, and may be formed by a removable gutter, the pipes *e* being made more flaring than in Fig. 1. The action of this form of the apparatus is generally like that of the form shown in Fig. 1, and corresponding parts are marked with the same letters of reference, and in the following claims I mean by "pipes" such pipes whether provided with plates E or not.

Instead of the gases or vapors being passed upward through the casing they may be passed downward therethrough, in which case the inlet for the gases or vapors will be at the upper part of the casing, and the outlet for the gases or vapors will be below the lowermost vessel B, and the filter will be placed between the said lowermost vessel B and the said outlet.

The funnels C and overflows from the vessels B enable a constant circulation of the liquid to be maintained. Surplus liquid which may be run in at the top of the apparatus or which may condense from the gases or vapors can leave or be drawn from the apparatus by a sealed outlet or valve at bottom.

There may be any suitable number of the arrangements of vessel and spraying devices, as described, and the casing can be conveniently made up of sections each carrying such an arrangement and superposed and luted together, as illustrated.

Having now particularly described and ascertained the nature of my said invention and in what manner the same is to be performed, I declare that what I claim is—

1. Apparatus for subjecting gases, or vapors, to the action of liquid, the said apparatus comprising a casing with an inlet and outlet for the gases, or vapors, a vessel to contain the liquid and a rotatable shaft having secured to, and surrounding, it, two, or more, concentric pipes, one within another and with the passage for gases, or vapors, surrounding their upper parts, and with their lower ends situated in the vessel for liquid, and means for rotating the said shaft and pipes to take up only liquid between them and distribute it in the form of spray across the said surrounding passage for gases, or vapors.

2. An apparatus for subjecting gases, or vapors, to the action of liquid, the said apparatus comprising a casing having an inlet and an outlet for the gases, or vapors, superposed vessels to contain the liquid, overflow-passages from the vessel above to the vessel beneath, inclined surfaces connected at top with the casing and terminating over, or within, the said vessels, and a central rotatable shaft for each vessel, carrying concentric pipes having the passage for gases, or vapors, surrounding their upper parts and having their lower ends in the vessel for liquid so that on rotating the shaft the said pipes, under centrifugal action, take up only liquid between them and distribute it in the form of spray across the surrounding space through which the gases, or vapors, pass, the sprayed liquid being returned to the vessels by the aforesaid inclined surfaces.

In testimony whereof I have signed this specification in the presence of two subscribing witnesses.

WALTHER FELD.

Witnesses:
WILLIAM ESSENWEIN,
PETER LIEBER.